Feb. 12, 1963

L. REDMAYNE ET AL 3,077,246

DISC BRAKES

Filed Feb. 16, 1960

INVENTORS:
LEONARD REDMAYNE
ALEXANDER JOHN WILSON
LEONARD WILLIAM KINGS
by Walter S. Bleston
ATTORNEY

United States Patent Office 3,077,246
Patented Feb. 12, 1963

3,077,246
DISC BRAKES
Leonard Redmayne, Knowle, Solihull, Alexander John Wilson, Sutton Coldfield, and Leonard William Kings, Leamington Spa, England, assignors to Girling Limited, Birmingham, England, a British company
Filed Feb. 16, 1960, Ser. No. 8,975
9 Claims. (Cl. 188—73)

This invention relates to improvements in disc brakes.

In a disc brake according to our invention, the disc comprises a flat ring mounted on and extending radially inwards from an annular member rotating with a wheel or other part of a vehicle transmission, and friction pads adapted to engage one face of the disc are mounted on opposite ends of a floating beam while friction pads adapted to engage the opposite face of the disc are pivotally mounted on the outer ends of opposed substantially radial levers which fulcrum on coupling rods which connect the levers and beam and of which the axes are substantially parallel to the axis of the disc, the torque being taken by a stationary spider or like member providing abutments for the coupling rods or, preferably, for the beam and levers.

A clearance between the friction pads and the disc in the off position of the brake may be maintained by compression springs arranged between the spider and the beam and levers.

The brake is applied by a force acting on the inner ends of the levers substantially in the direction of the axis of the axle. The levers may be actuated manually but are preferably actuated by any convenient hydraulic, pneumatic, or electro-magnetic means, one advantage of our improved brake being that the actuating means can be sufficiently far from the disc to prevent it from being affected by heat generated in the disc when the brake is applied.

When the brake is applied the levers rock on their fulcrums on the coupling rods and urge the friction pads on their outer ends against the disc, and the pull on the rods draws the beam towards the levers to urge the pads on the beam against the opposite face of the disc, the opposed forces acting on the disc being balanced.

One practical form of brake in accordance with our invention is illustrated by way of example in the accompanying drawings in which, FIGURE 1 is an end elevation of the brake;

Figure 1:
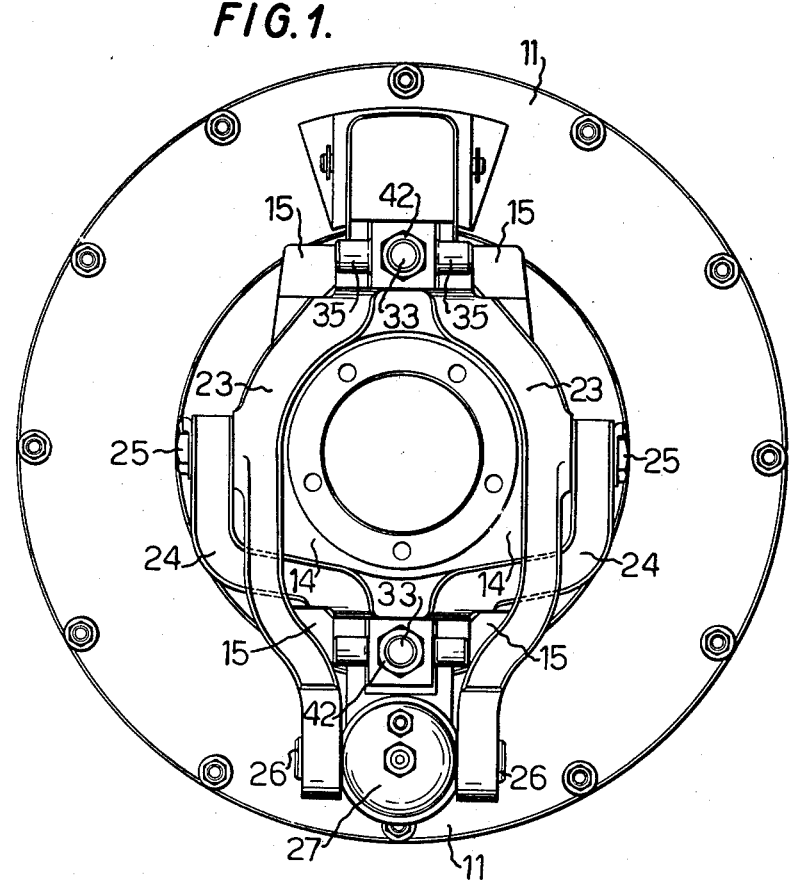
Figure 2:
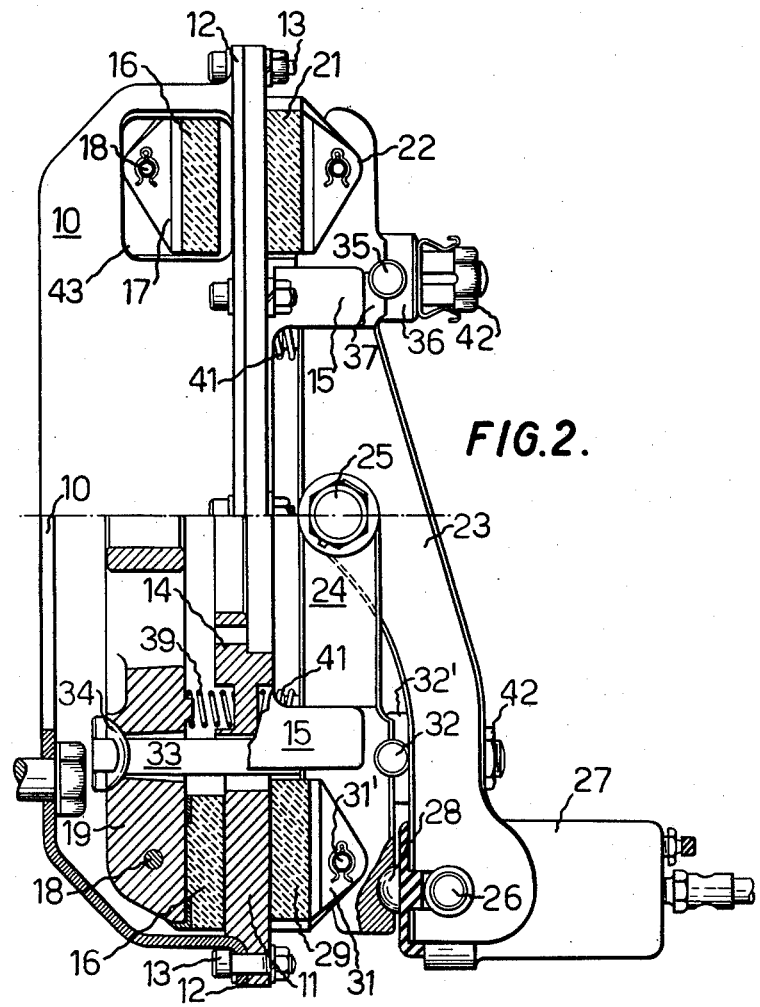
FIGURE 2 is a side elevation in part section.
Figure 3:
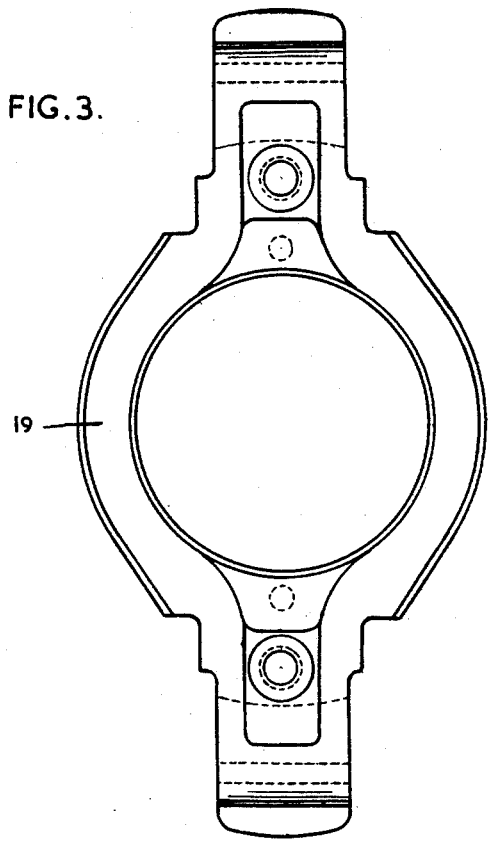
FIGURE 3 is an end elevation of a banjo lever forming part of the mechanism.
Figure 4:
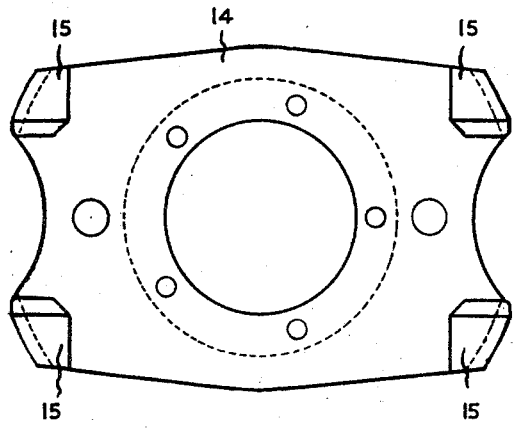
FIGURE 4 is an end elevation of a stationary member which takes the torque on the brake mechanism when the brake is applied.
Figure 5:
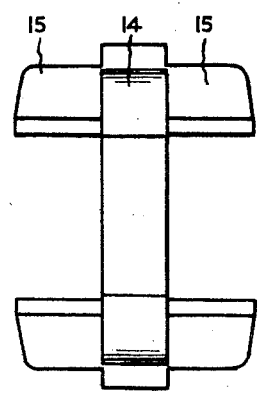
FIGURE 5 is an end view of the member shown in FIGURE 4.

In the brake illustrated 10 is a rigid bell housing which rotates with a wheel or other part of a vehicle transmission. An annular brake disc 11 with flat parallel faces extends radially inwards from a peripheral flange 12 on the bell housing to which it is secured by bolts 13.

The bell housing is designed to fit within a dished wheel rotatably mounted on a fixed axle. A rigid spider member 14 is fixed on the axle substantially in the plane of the brake disc and has on opposite faces spaced lugs or horns 15 forming torque-taking abutments for the beam and levers as described below. The spider is conveniently bolted to a radial flange integral with or welded to the axle.

Friction pads 16 adapted to engage on the face of the brake disc are carried by brake shoes 17 which are pivotally mounted by means of pins 18 on opposite ends of a rigid beam 19 extending diametrically within the bell housing, the beam being movable towards and away from the disc. The beam is of banjo outline to clear the axle and the inner end of the wheel hub.

The opposite face of the brake disc is adapted to be engaged by friction pads substantially in alignment with those carried by the beam. One pad 21 is carried by a shoe 22 pivotally mounted on the upper arm of a banjo-shaped actuating lever 23 the longer lower arm of which is pivotally coupled at the middle of the lever length to the upper arm of a Y-shaped second lever 24, the coupling being effected by aligned pins 25 of which the axis is in a plane containing the axis of the axle. The lower arm of the actuating lever is bifurcated at its end, and is coupled by trunnions 26 to a floating fluid pressure cylinder 27. A piston working in the cylinder carries a thrust head 28 engaging a recessed abutment on the lower end of the lever 24.

A second friction pad 29 is carried by a brake shoe 31 pivotally mounted by means of a pin 31' in the lower arm of the lever 24. On the inner side of the shoe 31 the lever 24 is adapted to fulcrum on opposed trunnions 32 carried by a sleeve 32' which is axially slidable on a draw bar 33 coupled to the beam 19, the axial thrust on the sleeve 32' being taken by a nut 42 screwed on to the free end of the draw bar. The draw bar has a part-spherical head 34 engaging in a complementary recess in the outer face of the beam to allow for small relative angular movement, and the axis of the draw bar is substantially parallel to that of the axle. Similarly, on the inner side of the shoe 22 the actuating lever 23 is adapted to fulcrum on trunnions 35 carried by a sleeve 36 which is slidable on a draw bar similar to the draw bar 33 and coupled to the beam 19 adjacent to its upper end, the axial thrust on the sleeve 36 being taken by a nut 42 on the draw bar.

The actuating lever 23 and the second lever 24 are formed with laterally projecting bosses 37 which are received between the horns 15 on the fixed spider 14 which takes the torque on these members when the brake is applied, and the beam 19 has similar bosses engaging between the horns on the other side of the spider.

When fluid under pressure is admitted to the cylinder 27 the cylinder applies a pull to the lower end of the actuating lever 23 moving it away from the brake disc, and the piston applies a thrust to the lower end of the lever 24. The lever 23 rocks about the trunnions 35 on the upper draw bar as a fulcrum so that the friction pad 21 is urged into engagement with the brake disc, and the reaction on the draw bar coupled to the beam urges the upper friction pad 16 into engagement with the opposite face of the disc. The angular movement of the lever 23 through the pins 25 rocks the second lever 24 about the trunnions 32 on the draw bar 33 as a fulcrum, and the friction pad 29 is urged into engagement with the adjacent face of the disc, while the reaction on the draw bar urges the lower friction pad 16 into engagement with the opposite face of the disc.

Compression springs 39 and 41 are arranged between the spider 14 and the beam 19 and between the spider and the levers 23 and 24 to urge the beam and the levers apart to the limit defined by the draw bars to maintain a clearance between the friction pads and the disc in the off position of the brake.

Adjustment of the effective lengths of the draw bars to compensate for wear of the friction pads can be effected by the nuts 42 screwed on to the free ends of the draw bars.

Openings 43 are provided in the bell housing 10 to provide access to the outer ends of the beams 19 for replacement of the friction pads when worn, and openings are preferably also provided in the wheel pressing to allow cooling air to flow over the bell housing and brake disc.

The lever 23 may be actuated in various ways other than that illustrated to apply the brake. It may for example be actuated mechanically by a pull-rod or cable or it may be actuated by electromagnetic means. Where the lever is actuated by a fluid pressure actuator it is not essential for the actuator to apply a thrust to the lever 24, and the lower end of the lever 23 may be pivotally coupled to the piston-rod of a piston working in a stationary cylinder.

In a modification the draw bars may engage between the lugs or horns on the spider to take the torque on the shoes when the brake is applied.

We claim:
1. A disc brake comprising
   (a) a fixed member;
   (b) an annular member rotatable relative to said fixed member about an axis;
   (c) a brake disc having two annular opposite faces, said brake disc being secured to said rotatable member;
   (d) an elongated floating beam axially movable toward and away from one of said faces;
   (e) a plurality of friction members mounted on said beam for engagement with said one face when the beam moves toward the same;
   (f) two draw bar means pivotally secured to respective longitudinally spaced portions of said beam and axially extending therefrom, said draw bar means having respective end portions spaced from the other one of said faces in a direction away from said floating beam;
   (g) a first and a second lever having each two arms and a portion intermediate said arms, said portion being connected to a respective one of said end portions for pivotal movement of said lever relative to the respective end portion in an axially extending plane, one arm of each lever being connected to the corresponding arm of the other lever for joint movement;
   (h) a friction member on the other arm of each lever and movable into engagement with said other face of said brake disc by said pivotal movement of the respective lever;
   (i) actuating means for actuating pivotal movement of at least one of said levers on the corresponding draw bar means; and
   (j) torque-taking means on said fixed member for connecting said beam and said levers to said fixed member and for resisting circumferential movement of said beam and of said levers when the respective friction members engage said brake disc.

2. A disc brake as in claim 1, wherein said first lever is of a length substantially equal to the diameter of said brake disc, a terminal portion of the other arm of said first lever carries said friction member and said one arm has a terminal portion operatively connected to said actuating means and another portion intermediate said terminal portion and the portion of said first lever which is pivotally connected to one of said draw bars, said intermediate portion being pivotally secured to said one arm of said second lever.

3. A disc brake as in claim 1 wherein said rotatable annular member is a bell housing within which said beam is located, and the friction members mounted on the beam comprise brake shoes and means for pivotally mounting said brake shoes on opposite ends of the beam which is of banjo outline.

4. A disc brake as in claim 1, including a pivotal connection between said first and second levers for angular movement of said levers about an axis which is at right angles to and substantially in a plane containing the axis of the brake disc.

5. A disc brake as in claim 1 wherein said actuating means comprises a floating fluid-pressure cylinder, piston, and piston-rod assembly, means pivotally connecting said cylinder to said first lever, and an abutment on said second lever with which said piston rod engages.

6. A disc brake as in claim 1 wherein said drawbars at one end have a rocking engagement with spaced points on said beam and the other ends of the drawbars carry fulcrums for the first and second levers.

7. A disc brake as in claim 1 wherein said torque-taking means comprises a stationary spider having spaced lugs between which said beam and said first and second levers engage.

8. A disc brake as in claim 1 wherein said torque-taking means comprises abutments for said beam and said first and second levers, and springs located between said stationary member and said beam and levers for maintaining a clearance between the friction members and the disc in the off position of the brake.

9. A disc brake comprising
   (a) a fixed member;
   (b) an annular brake disc rotatable relative to said fixed member about an axis, said disc having two faces directed in opposite axial directions;
   (c) floating beam means movable toward and away from one of said faces in an axial direction;
   (d) a plurality of friction members longitudinally spaced on said beam for engagement with said one face when said beam moves toward the same;
   (e) two draw bar means pivotally secured to respective longitudinally spaced portions of said beam and having respective end portions spaced from the other face of said brake disc in a direction away from from said one face;
   (f) a first and a second lever having each a portion connected to a respective one of said end portions and an arm extending from the connected portion and having a free terminal portion;
   (g) motion transmitting means connecting said levers for joint movement of said free end portions thereof toward and away from said other face;
   (h) a friction member on each of said free terminal portions of said levers and engageable with said other face when said free end portions move toward the same;
   (i) actuating means for actuating said joint movement; and
   (j) connecting means connecting said beam and said levers to said fixed member for resisting circumferential movement of said beam and of said levers when the respective friction members engage said brake disc.

References Cited in the file of this patent
UNITED STATES PATENTS

| 2,115,083 | Pierce | Apr. 26, 1938 |
| 2,153,280 | Shelor | Apr. 4, 1939 |
| 2,586,518 | Collier | Feb. 19, 1952 |
| 2,867,295 | Butler | Jan. 6, 1959 |

FOREIGN PATENTS

| 1,169,939 | France | Sept. 15, 1958 |
| 654,894 | Great Britain | July 4, 1951 |
| 778,094 | Great Britain | July 3, 1957 |